United States Patent
Liu et al.

(10) Patent No.: US 11,187,670 B2
(45) Date of Patent: Nov. 30, 2021

(54) METHOD FOR DECREASING BASELINE UNDER HIGH TEMPERATURE OF GAS SENSOR

(71) Applicant: Honeywell International Inc., Charlotte, NC (US)

(72) Inventors: Ling Liu, Nanjing (CN); Yan Zhang, Beijing (CN); Na Wei, Shanghai (CN); Fucheng Zhang, Shanghai (CN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 290 days.

(21) Appl. No.: 16/073,466

(22) PCT Filed: Jan. 29, 2016

(86) PCT No.: PCT/CN2016/072685
§ 371 (c)(1),
(2) Date: Jul. 27, 2018

(87) PCT Pub. No.: WO2017/128280
PCT Pub. Date: Aug. 3, 2017

(65) Prior Publication Data
US 2019/0025246 A1  Jan. 24, 2019

(51) Int. Cl.
*G01N 27/413* (2006.01)
*G01N 27/49* (2006.01)
*G01N 27/404* (2006.01)

(52) U.S. Cl.
CPC ......... *G01N 27/413* (2013.01); *G01N 27/404* (2013.01); *G01N 27/4045* (2013.01); *G01N 27/49* (2013.01)

(58) Field of Classification Search
CPC .... G01N 27/413; G01N 27/404; G01N 27/49; G01N 27/4045
See application file for complete search history.

(56) References Cited

U.S. PATENT DOCUMENTS

| 4,111,765 A | * | 9/1978 | De Nora | ........... C04B 35/58064 |
| | | | | 204/196.38 |
| 4,769,122 A | * | 9/1988 | Marrese | ............. G01N 27/4045 |
| | | | | 204/408 |

(Continued)

FOREIGN PATENT DOCUMENTS

| CN | 1228848 A | 9/1999 |
| CN | 1516810 A | 7/2004 |

(Continued)

OTHER PUBLICATIONS

Extended European Search Report for European Application No. 16887165.5 dated Oct. 21, 2019.

(Continued)

*Primary Examiner* — Gurpreet Kaur
(74) *Attorney, Agent, or Firm* — Alston & Bird LLP

(57) ABSTRACT

Embodiments relate generally to systems and methods for preventing reaction between a sealing material (epoxy) and an electrolyte material within a carbon monoxide (or other gas) sensor. In general, the electrochemical sensor disclosed herein comprises a gas diffusion working electrode, a counter electrode, and optionally, a reference electrode. Each electrode is in contact with an aqueous electrolyte. The gas sensor may comprise a tab located proximate to gaps in the housing of the sensor, wherein the tab prevents any sealing material that fills the gaps from entering the interior of the housing. In some embodiments, the tab may be attached to a counter electrode. In some embodiments, the housing may comprise a slot located about the gaps, wherein the tab fits into the slot of the housing.

15 Claims, 4 Drawing Sheets

(56) References Cited

U.S. PATENT DOCUMENTS

| | | | |
|---|---|---|---|
| 5,284,566 A * | 2/1994 | Cuomo | G01N 27/4045 204/412 |
| 5,338,429 A | 8/1994 | Jolson et al. | |
| 5,914,019 A | 6/1999 | Dodgson et al. | |
| 6,258,234 B1 * | 7/2001 | Watanabe | G01N 27/407 204/424 |
| 6,275,639 B1 | 8/2001 | Bolt et al. | |
| 6,454,923 B1 | 9/2002 | Dodgson et al. | |
| 7,022,213 B1 | 4/2006 | Austen et al. | |
| 7,608,177 B2 | 10/2009 | Nauber et al. | |
| 2003/0168336 A1 | 9/2003 | Downer et al. | |
| 2004/0128823 A1 | 7/2004 | Mole | |
| 2007/0131550 A1 | 6/2007 | Mizutani et al. | |
| 2013/0087456 A1 * | 4/2013 | Pratt | G01N 27/404 204/406 |
| 2015/0122649 A1 * | 5/2015 | Westmarland | G01N 27/404 204/415 |

FOREIGN PATENT DOCUMENTS

| | | |
|---|---|---|
| CN | 1875266 A | 12/2006 |
| CN | 2886565 Y | 4/2007 |
| CN | 101776640 A | 7/2010 |
| CN | 102636542 A | 8/2012 |
| CN | 104049020 A | 9/2014 |
| CN | 104634835 A | 5/2015 |
| WO | 2017128280 A1 | 8/2017 |

OTHER PUBLICATIONS

International Application No. PCT/CN2016/072685, International Search Report, dated Oct. 27, 2016, 4 pages.
International Application No. PCT/CN2016/072685, Written Opinion of the International Searching Authority, dated Oct. 27, 2016, 4 pages.
Office Action for Chinese Patent Application No. 201680084182.2 dated Jul. 3, 2020, 16 pages.
Communication Pursuant to Article 94(3) issued in European Application No. 16887165.5 dated Mar. 1, 2021, 4 pages.
Office Action issued in Chinese Application No. 201680084182.2 dated Mar. 8, 2021, 14 pages.
Decision on Rejection issued in Chinese Application No. 201680084182.2 dated Jun. 2, 2021, 8 pages.

* cited by examiner

METHOD FOR DECREASING BASELINE UNDER HIGH TEMPERATURE OF GAS SENSOR

CROSS-REFERENCE TO RELATED APPLICATIONS

The present application claims priority to and is the National Stage of International Application. No. PCT/CN2016/072685, filed Jan. 29, 2016 and entitled "Method For Decreasing Baseline Under High Temperature Of Gas Sensor," which is incorporated herein by reference its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Devices for detecting and generating a warning with respect to dangerous conditions, such as the presence of carbon monoxide (CO), are known. Some CO sensors may comprise electrochemical sensors. Electrochemical sensors, in general, may employ a chemical reaction to convert CO to carbon dioxide (CO2) to create a chemical imbalance in a portion of the cell which in turn generates a current indicative of the amount of CO present.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for preventing reaction between a sealing material (epoxy) and an electrolyte material within a carbon monoxide (or other gas) sensor. In general, the electrochemical sensor disclosed herein comprises a gas diffusion working electrode, a counter electrode, and optionally, a reference electrode. Each electrode is in contact with an aqueous electrolyte. The gas sensor may comprise a tab located proximate to gaps in the housing of the sensor, wherein the tab prevents any sealing material that fills the gaps from entering the interior of the housing. In some embodiments, the tab may be attached to a counter electrode. In some embodiments, the housing may comprise a slot located about the gaps, wherein the tab fits into the slot of the housing.

Figure 1:
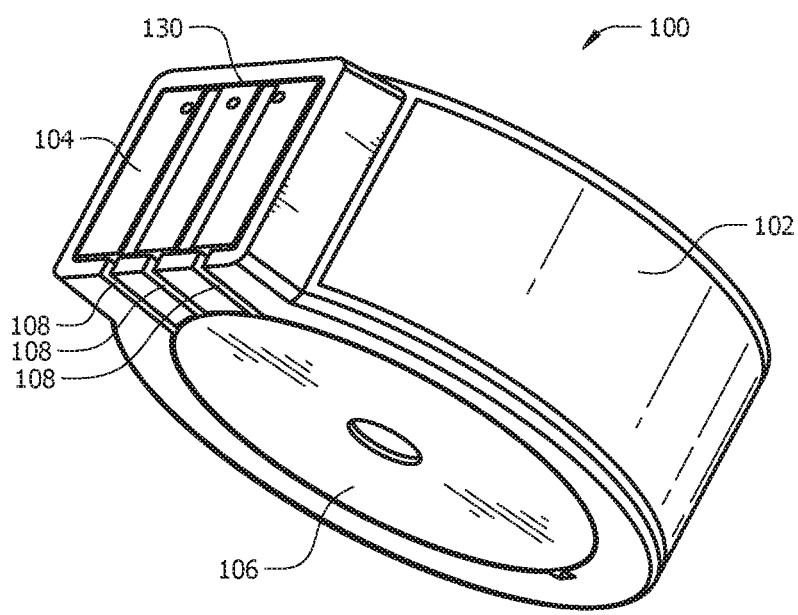
FIG. 1 illustrates an assembled view of a gas sensor according to an embodiment of the disclosure.

Referring now to FIG. 1, an exemplary embodiment of a sensor 100 is shown. In some embodiments, the sensor 100 may comprise a CO sensor. The sensor 100 may comprise a housing 102, wherein the housing 102 may comprise gaps 108 to allow one or more wires/leads (not shown) to pass through into the housing 102. In some embodiments, the wire may comprise platinum wires, wherein the wires may serve as current collectors. The housing 102 may also comprise a frame 130, wherein a connector printed circuit board (PCB) 104 may be operable to fit within the frame 130. The connector PCB 104 may be attached to the one or more wires. In some embodiments, the sensor 100 may comprise a bottom cover or label 106.

Figure 2:
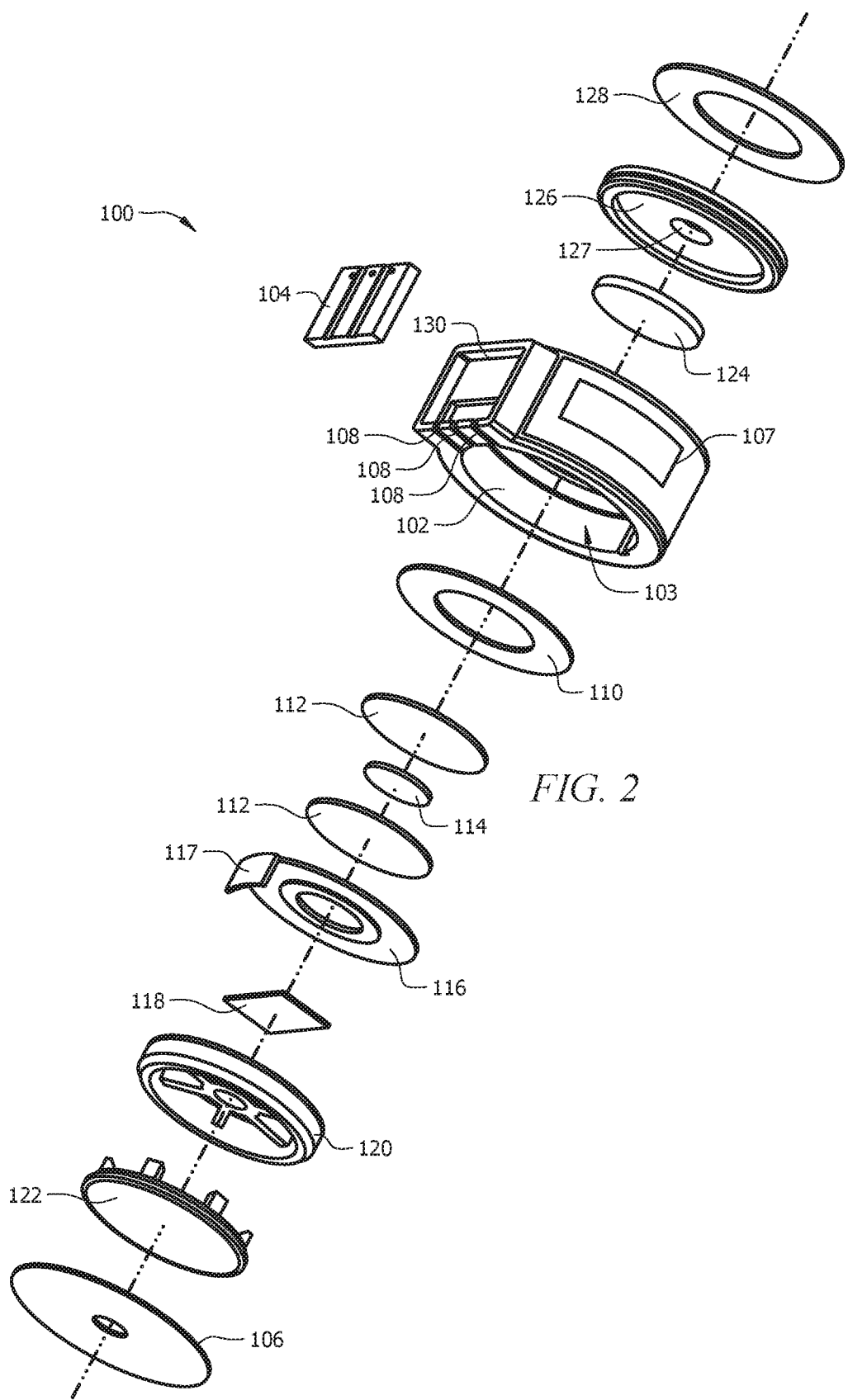
FIG. 2 illustrates an exploded view of a gas sensor according to an embodiment of the disclosure.

Referring now to FIG. 2, an exploded view of the sensor 100 is shown. The sensor 100 generally comprises a housing 102 defining a cavity or reservoir 103 designed to hold an electrolyte solution. A working (or sensing) electrode 110 can be placed between an opening 127 and the reservoir 103, wherein the opening 127 allows a gas to be detected to enter the housing 102. A counter electrode 116 and a reference electrode 114 can be positioned within the reservoir. When the gas reacts within the reservoir 103, an electrical current and/or potential can be developed between the electrodes to provide an indication of the concentration of the gas. A reference electrode 114 may also be positioned within the reservoir 103 to provide a reference for the detected current and potential between the working electrode 110 and the counter electrode 116.

The housing 102 can generally be formed from any material that is substantially inert to the electrolyte and gas being measured. In an embodiment, the housing 102 can be formed from a polymeric material, a metal, or a ceramic. For example, the housing can be formed from a material including, but not limited to, acrylonitrile butadiene styrene (ABS), polyphenylene oxide (PPO), polystyrene (PS), polypropylene (PP), polyethylene (PE) (e.g., high density polyethylene (HDPE)), polyphenylene ether (PPE), or any combination or blend thereof.

One or more openings 127 can be formed through the housing 102 to allow the ambient gas to enter the housing 102 and/or allow any gases generated within the housing to escape. In an embodiment, the sensor 100 may comprise at least one inlet opening 127 to allow the ambient gas to enter the housing 102. The opening 127 can be disposed in a cap 126 (or top cover) when a cap is present and/or in a wall of the housing 102. In some embodiments, the sensor 100 may comprise a top cover 126 operable to fit into the housing 102 and at least partially seal the sensor 100. In some embodiments, the top cover 126 may comprise an opening to allow a gas flow to enter the sensor 100. In some embodiments, the sensor 100 may comprise a dust cover 128 located around the opening 127 to the sensor 100, operable to prevent unwanted particles from entering the sensor 100.

In some embodiments, the sensor 100 may comprise a carbon filter 124 operable to filter ambient air flowing into the housing 102 via the opening 127. In some embodiments, the carbon filter 124 may function as a diffusion barrier to restrict the flow of gas (e.g., carbon monoxide, hydrogen sulfide, etc.) to the working electrode 110. In another embodiment, a diffusion bather can be created by forming the opening 127 as a capillary and/or a film or membrane can be used to control the mass flow rate through the one or more openings 127.

The reservoir 103 comprises the counter electrode 116, the reference electrode 114, and the working electrode 110. In some embodiment, the electrolyte can be contained within the reservoir 103, and the counter electrode 116, the reference electrode 114, and the working electrode 110 can be in electrical contact through the electrolyte. In some embodiments, one or more porous separators 112, 118 or other porous structures can be used to retain the electrolyte in contact with the electrodes. The separators 112, 118 can comprise a porous member that acts as a wick for the retention and transport of the electrolyte between the reservoir and the electrodes while being electrically insulating to prevent shorting due to direct contact between any two electrodes. One or more of the porous separator 112, 118 can extend into the reservoir to provide the electrolyte a path to the electrodes. In an embodiment, a separator 112 can be disposed between the counter electrode 116 and the reference electrode 114, and a separator 112 can be disposed between the reference electrode 114 and the working electrode 110.

One or more of the separators 112, 118 can comprise a nonwoven porous material (e.g., a porous felt member), a woven porous material, a porous polymer (e.g., an open cell foam, a solid porous plastic, etc.), or the like, and is generally chemically inert with respect to the electrolyte and the materials forming the electrodes. In an embodiment, the separator 112, 118 can be formed from various materials that are substantially chemically inert to the electrolyte including, but not limited to, glass (e.g., a glass mat, glass fiber), polymer (plastic discs), ceramics, or the like.

The electrolyte can be any conventional aqueous acidic electrolyte such as sulfuric acid, phosphoric acid, or a neutral ionic solution such as a salt solution (e.g., a lithium salt such as lithium chloride, etc.), or any combination thereof. For example, the electrolyte can comprise sulfuric acid having a molar concentration between about 3 M to about 12 M. Since sulfuric acid is hygroscopic, the concentration can vary from about 10 to about 70 wt % (1 to 11.5 molar) over a relative humidity (RH) range of the environment of about 3 to about 95%. In an embodiment, the electrolyte can comprise phosphoric acid having a concentration in an aqueous solution between about 30% to about 60% $H_3PO_4$ by weight. As another example, the electrolyte can include a lithium chloride salt having about 30% to about 60% LiCl by weight, with the balance being an aqueous solution.

In some embodiments, the electrolyte may be in the form of a solid polymer electrolyte which comprises an ionic exchange membrane. In some embodiments, the electrolyte can be in the form of a free liquid, disposed in a matrix or slurry such as glass fibers (e.g., the separator 118, the separator 112, etc.), or disposed in the form of a semi-solid or solid gel.

The working electrode 110 may be disposed within the housing 102. The gas entering the sensor 100 can contact one side of the working electrode 110 and pass through working electrode 110 to reach the interface between the working electrode 110 and the electrolyte. The gas can then react to generate the current indicative of the gas concentration.

The counter electrode 116 can be disposed within the housing 102. The counter electrode 116 can comprise a substrate or membrane such as a polytetrafluoroethylene (PTFE) membrane, a GEFC-IES membrane, a Nafion® membrane, or the like having a catalytic material disposed thereon. In an embodiment, the catalytic material can be mixed and disposed on the membrane using any suitable process such as rolling, coating, screen printing, or the like to apply the catalytic material on the membrane. In an embodiment, the catalytic material for the counter electrode 116 can comprise a noble metal such as gold (Au), platinum (Pt), ruthenium (Ru), rhodium (Rh), Iridium (Jr), oxides thereof, or any combination thereof.

Similarly, the reference electrode 114 can be disposed within the housing 102. The reference electrode 114 can comprise a substrate or membrane such as a PTFE membrane, a GEFC-IES membrane, a Nafion® membrane, or the like having a catalytic material disposed thereon. In an embodiment, the catalytic material can be mixed with a hydrophobic material (e.g., PTFE, etc.) and disposed on the PTFE membrane. In an embodiment, the catalytic material used with the reference electrode 114 can comprise a noble metal such as gold (Au), platinum (Pt), ruthenium (Ru), rhodium (Rh), Iridium (Jr), oxides thereof, or any combination thereof. In an embodiment, the catalytic material used to form the reference electrode can comprise a Pt-Ru mixture that is screen printed on the membrane, where the membrane can be a GEFC-IES membrane. While illustrated in FIG. 2 as having the reference electrode 114, some embodiments of the electrochemical sensor may not include a reference electrode 114.

In some embodiments, the separator 118 may comprise a wick 118 operable to collect electrolyte and ensure that the other elements in the sensor 100 remain wetted. In some embodiments, the sensor 100 may comprise a support 120 for the stack of electrodes. In some embodiments, the support 120 may create a cavity within the sensor 100, wherein electrolyte (or acid) may be located within the cavity of the support 120. In some embodiments, the sensor 100 may comprise a bottom cover 122 operable to fit into the housing 102 and seal the bottom of the sensor 100. In some embodiments, the sensor 100 may comprise one or more label 106, 107 located on the exterior of the sensor 100.

In order to detect the current and/or potential difference across the electrodes in response to the presence of a gas (carbon monoxide), one or more leads or electrical contacts can be electrically coupled to the working electrode 110, the reference electrode 114, and/or the counter electrode 116. The lead contacting the working electrode 110 can contact either side of the working electrode 110 since the substrate comprises an electrically conductive material. In order to avoid the corrosive effects of the electrolyte, the lead contacting the working electrode can contact the side of the working electrode 110 that is not in contact with the electrolyte. Leads may be similarly electrically coupled to the counter electrode 116 and the reference electrode 114. The leads can be electrically coupled to external connection pins to provide an electrical connection to external processing circuitry (or a PCB) 104. The external circuitry 104 can detect the current and/or potential difference between the electrodes and convert the current into a corresponding gas concentration.

The leads may pass through gaps 108 in the housing 102 between the external circuitry 104 and the electrodes. In some embodiments, the gaps 108 may be sealed with epoxy (or another similar sealing material) to prevent electrolyte from leaking out of the sensor 100 via the gaps 108. Therefore, when the sensor 100 is in operation, the epoxy may be in contact with the electrolyte. In some embodiments, especially if the sensor 100 is operating at an elevated temperature, the epoxy material may react with the electrolyte to form volatile organic compounds (VOCs.) This may disrupt the sensor 100, possibly causing false alarms and increasing the baseline reading for the sensor. In some embodiments, this reaction may occur around 50 C or above.

In the embodiment of FIG. 2, the counter electrode 116 may comprise a tab 117 extending from a portion of the counter electrode 116. In some embodiments, the tab 117 may be incorporated into the PTFE membrane of the counter electrode 116. The tab 117 may be operable to prevent the epoxy filling the gaps 108 from contacting the electrolyte located within the reservoir 103. In some embodiments, the tab 117 may be approximately 4 millimeters in width. In some embodiments, the gaps 108 may be within approximately 4 millimeters of each other, such that the width of the tab 117 covers all of the gaps 108. In some embodiments, the distance between the extremities of the plurality of gaps 108 may be less than the width of the tab 117.

Figure 3:
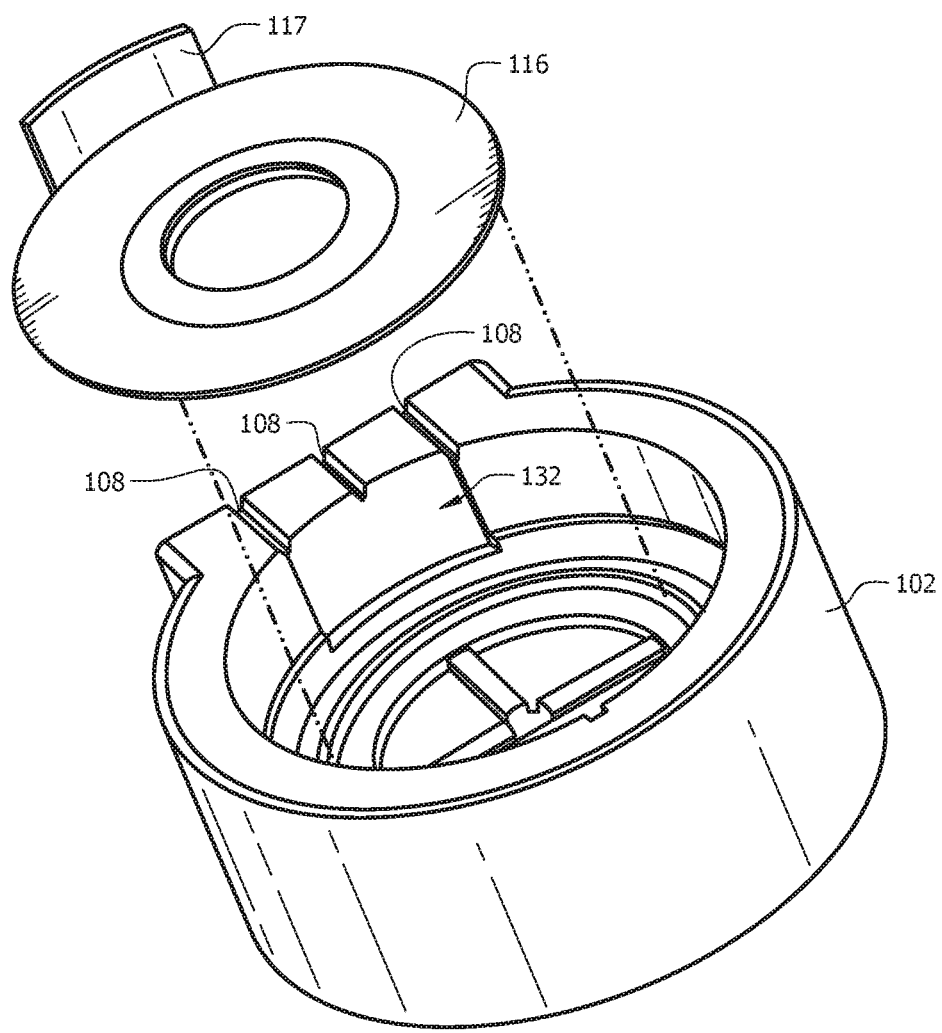
FIG. 3 illustrates a housing and counter electrode according to an embodiment of the disclosure.

Referring now to FIG. 3, the housing 102 and the counter electrode 116 are shown. As described above, the tab 117 of the counter electrode 116 may be operable to cover a portion of the gaps 108 into the housing 102, thereby preventing the epoxy sealing the gaps 108 to contact the electrolyte within the housing 102. The gaps 108 may be located near one another around the edge of the housing 102, allowing the tab 117 to be located on only a portion of the counter electrode 116, covering the gaps 108. As shown in FIG. 3, the housing 102 may comprise a slot 132 cut into the interior of the housing 102. The slot 132 may be located about the gaps 108. In an embodiment, the tab 117 of the counter electrode 116 may be shaped to fit within the slot 132. In some embodiments, the support 120 (shown in FIG. 2) may fix the tab 117 in place within the slot 132. In some embodiments, the leads (described above) may pass through the gaps 108 in the housing, through the slot 132 around the tab 117 and contact the electrodes as necessary. Before the gaps 108 are filled with epoxy, the counter electrode 116 may be in place within the housing 102, such that the tab 117 is filling the slot 132. Then, the epoxy may fill the gaps 108 but stop when it contacts the tab 117.

In some embodiments, the tab 117 may not completely prevent the electrolyte from contacting the epoxy. In this case, the tab 117 may reduce the interaction between the electrolyte and the epoxy. Also, in some embodiments, if the epoxy and electrolyte react, the tab 117 may impede the path of any gases formed by the reaction from entering the rest of the sensor 100 and disrupting the sensor 100.

Figure 4A:
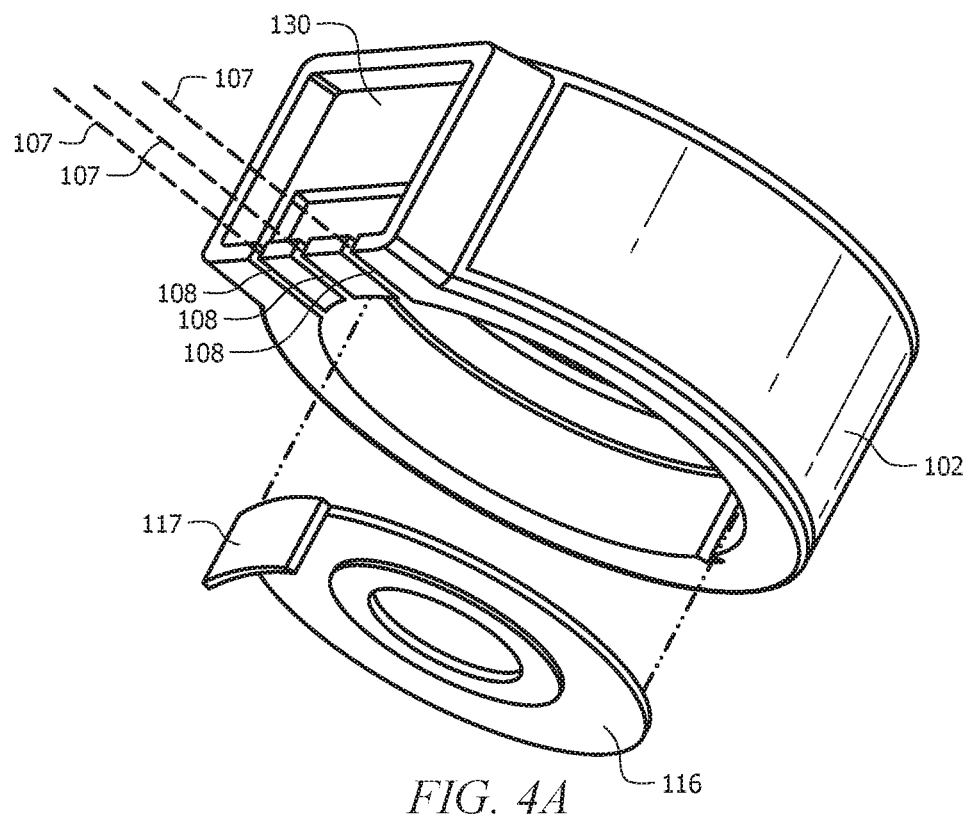
FIGS. 4A-4B illustrate the assembly of a housing and counter electrode according to an embodiment of the disclosure.
Figure 4B:
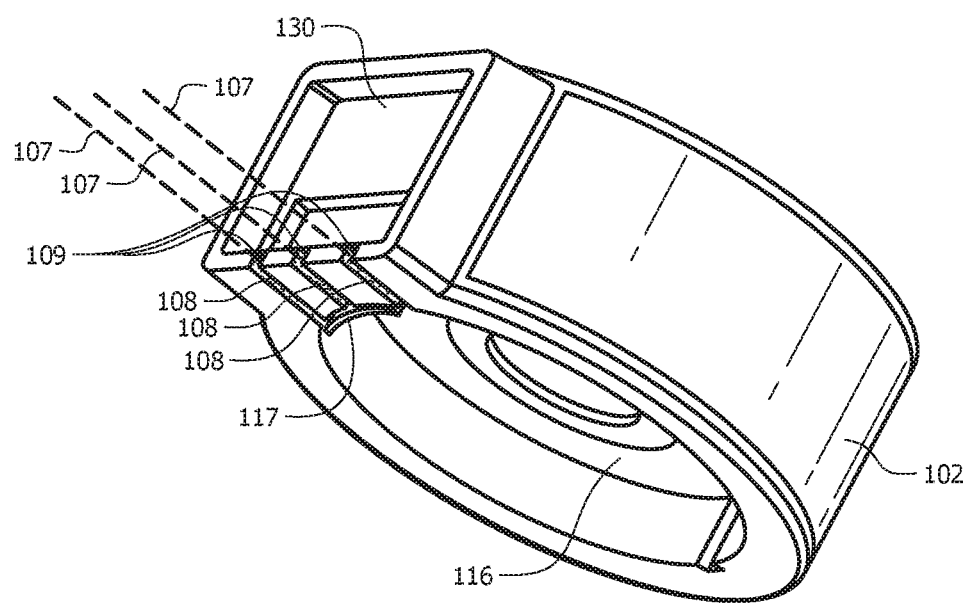

FIGS. 4A-4B illustrate an assembly method for the housing 102 and the counter electrode 116. In FIG. 4A, leads 107 may be insert into the housing 102 via the gaps 108. Then, the tab 117 of the counter electrode 116 may be fitted into the slot 132 (not shown). In FIG. 4B. the tab 117 may be in place within the housing 102, and the gaps 108 may be filled with sealing material 109 (or epoxy). FIGS. 4A-4B show only a portion of the assembly method for the entire gas sensor 100.

In some embodiments, embodiments may include a method of manufacture for a gas sensor, wherein the method includes placing leads through gaps in a housing, assembling at least a counter electrode within the housing, wherein the counter electrode comprises a tab placed proximate to the gaps, and then filling the gaps (around the leads) with epoxy to seal the gaps, wherein the tab prevents the epoxy from entering the interior of the housing.

Embodiments of the disclosure may comprise an electrochemical gas sensor comprising a housing; an electrolyte disposed within the housing; a plurality of electrodes in contact with the electrolyte within the housing, wherein the plurality of electrodes comprise a working electrode and a counter electrodes, and wherein the plurality of electrodes contact a plurality of leads passing through one or more gaps in the housing, and wherein the gaps in the housing are sealed with a sealing material; and a tab located within the housing proximate to the gaps in the housing, operable to prevent the sealing material from entering the interior of the housing.

In some embodiments, the tab is incorporated into the counter electrode. In some embodiments, the tab is incorporated into the PTFE membrane of the counter electrode. In some embodiments, the tab extends perpendicular to the surface of the counter electrode. In some embodiments, the tab comprises a PTFE material. In some embodiments, the plurality of electrodes further comprises a reference electrode. In some embodiments, the gas sensor may further comprise an external circuitry operable to fit into a portion of the housing and contact the plurality of leads. In some embodiments, the gas sensor may further comprise a support operable to support the plurality of electrodes and create a cavity operable to hold the electrolyte. In some embodiments, the housing comprises a slot located about the gaps, and wherein the tab fits within the slot in the housing. In some embodiments, the sealing material comprises an epoxy material. In some embodiments, the gaps are located within approximately 4 millimeters of each other. In some embodiments, the tab is approximately 4 millimeters in width.

Additional embodiments of the disclosure may comprise a method for assembling a gas sensor comprising providing a housing, wherein the housing comprises one or more gaps and a slot on the interior of the housing; inserting a plurality of leads into the housing via the gaps, wherein a portion of the leads extend out of the housing; placing a tab within the housing, wherein the tab fits into the slot of the housing, and wherein the tab is located proximate to the one or more gaps;

and filling the gaps with a sealing material, wherein the tab is operable to prevent the sealing material from entering the interior of the housing.

In some embodiments, the method may further comprise placing an electrolyte within the housing; and placing a plurality of electrodes within the housing, wherein the plurality of electrodes are in contact with the electrolyte, and wherein the plurality of electrodes are in contact with the plurality of leads. In some embodiments, the tab is incorporated into an electrode.

Other embodiments of the disclosure may comprise an electrochemical gas sensor comprising a housing; an electrolyte disposed within the housing; a plurality of electrodes in contact with the electrolyte within the housing; a plurality of leads passing through one or more gaps in the housing, wherein the leads contact the plurality of electrodes, and wherein the gaps in the housing are sealed with a sealing material; and a tab located within the housing proximate to the gaps in the housing, operable to prevent the sealing material from entering the interior of the housing.

In some embodiments, the tab is incorporated into the counter electrode. In some embodiments, the tab is incorporated into the PTFE membrane of the counter electrode. In some embodiments, the housing comprises a slot located about the gaps, and wherein the tab fits within the slot in the housing. In some embodiments, the gaps are located within approximately 4 millimeters of each other.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An electrochemical gas sensor comprising:
    a housing comprises one or more gaps and a slot located about the one or more gaps;
    an electrolyte disposed within the housing;
    a plurality of electrodes in contact with the electrolyte within the housing, wherein the plurality of electrodes comprise a working electrode and a counter electrode, and wherein the plurality of electrodes contact a plurality of leads passing through the one or more gaps in the housing, and wherein the one or more gaps in the housing are sealed with a sealing material; and
    a tab incorporated into the counter electrode and located within the housing, wherein the tab extends perpendicular to the surface of the counter electrode and covers at least a portion of the one or more gaps to prevent the sealing material from entering the interior of the housing, and wherein the tab is configured to fit within the slot of the housing to prevent the sealing material in the gaps from contacting the electrolyte located within the housing.

2. The gas sensor of claim 1, wherein the tab is incorporated into a polytetrafluoroethylene membrane of the counter electrode.

3. The gas sensor of claim 1, wherein the tab comprises a polytetrafluoroethylene material.

4. The gas sensor of claim 1, wherein the plurality of electrodes further comprises a reference electrode.

5. The gas sensor of claim 1 further comprising an external circuitry operable to fit into a portion of the housing and contact the plurality of leads.

6. The gas sensor of claim 1, further comprising a support operable to support the plurality of electrodes and create a cavity operable to hold the electrolyte.

7. The gas sensor of claim 1, wherein the sealing material comprises an epoxy material.

8. The gas sensor of claim 1, wherein the one or more gaps are located within approximately 4 millimeters of each other.

9. The gas sensor of claim 1, wherein the tab is approximately 4 millimeters in width.

10. A method for assembling a gas sensor comprising:
provperding a housing, wherein the housing comprises one or more gaps and a slot on the interior of the housing;
placing an electrolyte within the housing;
inserting a plurality of leads into the housing via the one or more gaps, wherein a portion of the leads extend out of the housing;
placing a tab within the housing, wherein the tab fits into the slot of the housing, wherein the tab is located within the housing, and wherein the tab extends perpendicular to the surface of a counter electrode and covers at least a portion of the one or more gaps, wherein the tab is operable to prevent a sealing material from contacting the electrolyte located within the housing.

11. The method of claim 10 further comprising:
placing a plurality of electrodes within the housing, wherein the plurality of electrodes are in contact with the electrolyte, and wherein the plurality of electrodes are in contact with the plurality of leads.

12. The method of claim 10, further comprising impeding, by the tab, a path of any gases formed by a reaction between the sealing material and an electrolyte from entering the rest of the gas sensor.

13. An electrochemical gas sensor comprising:
a housing comprises one or more gaps and a slot located about the one or more gaps;
an electrolyte disposed within the housing;
a plurality of electrodes in contact with the electrolyte within the housing;
a plurality of leads passing through the one or more gaps in the housing, wherein the leads contact the plurality of electrodes, and wherein the one or more gaps in the housing are sealed with a sealing material; and
a tab incorporated into a counter electrode and located within the housing, wherein the tab extends perpendicular to the surface of the counter electrode and covers at least a portion of the one or more gaps to prevent the sealing material from entering the interior of the housing, and wherein the tab is configured to fit within the slot of the housing to prevent the sealing material in the gaps from contacting the electrolyte located within the housing.

14. The gas sensor of claim 13, wherein the tab is incorporated into a polytetrafluoroethylene membrane of the counter electrode.

15. The gas sensor of claim 13, wherein the one or more gaps are located within approximately 4 millimeters of each other.

* * * * *